UNITED STATES PATENT OFFICE.

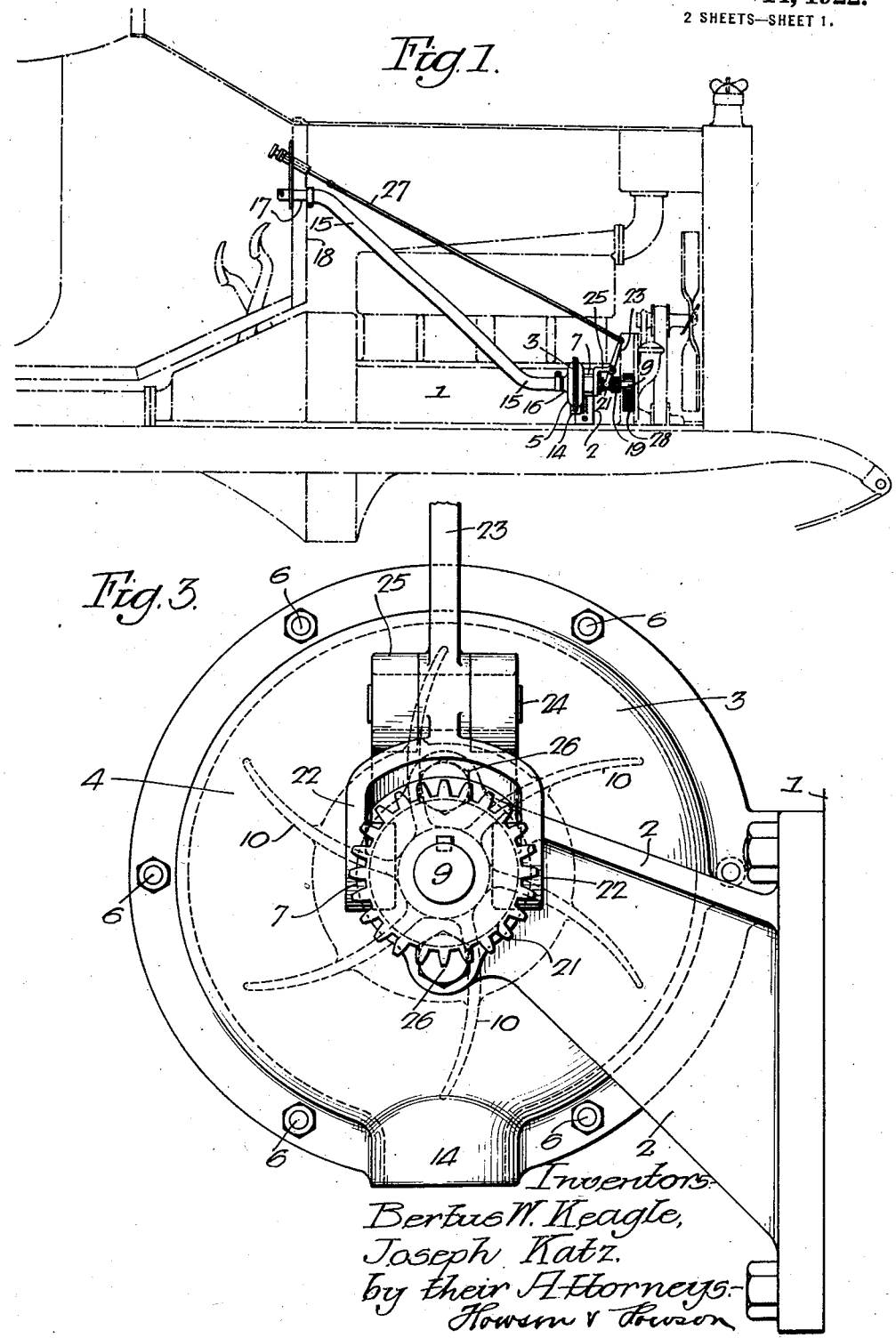

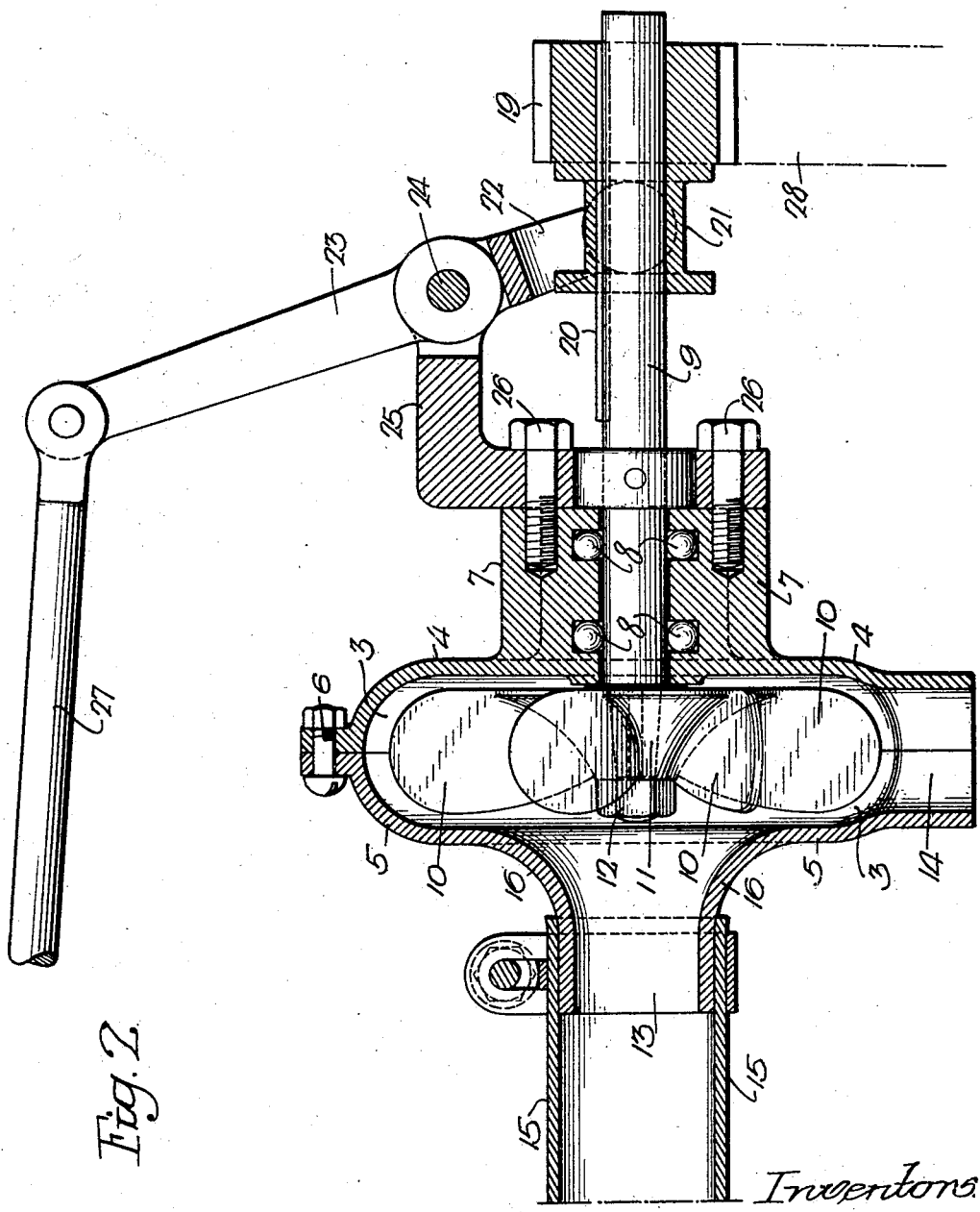

BERTUS W. KEAGLE AND JOSEPH KATZ, OF LEWISTOWN, PENNSYLVANIA.

VACUUM CLEANER FOR AUTOMOBILES.

1,409,183. Specification of Letters Patent. Patented Mar. 14, 1922.

Application filed December 1, 1920. Serial No. 427,471.

*To all whom it may concern:*

Be it known that we, BERTUS W. KEAGLE and JOSEPH KATZ, citizens of the United States, residing in Lewistown, Pennsylvania, have invented certain Improvements in Vacuum Cleaners for Automobiles, of which the following is a specification.

The object of our invention is to provide a vacuum cleaner which can be coupled directly to the engine of an automobile and which can be used for cleaning the upholstery and carpet of the automobile.

This object we attain in the following manner, reference being had to the accompanying drawing, in which:

Fig. 1 is a side view of sufficient of an automobile to illustrate our invention;

Fig. 2 is a sectional view showing our improved engine vacuum cleaner for automobiles, and Fig. 3 is an end view.

Referring to the drawing, 1 is the frame of an engine of an automobile, and 2 is a bracket secured to the frame. This bracket carries one portion 4 of the fan casing 3. The other portion 5 of the casing is secured to the portion 4 by bolts 6. A bearing 7 is formed on the section 4 and in this bearing are balls 8 adapted to raceways. Extending through the bearing is a driven shaft 9 carrying at its outer end the fan 10, which, in the present instance, is made as shown in the drawing. The head 11 of this fan is tapered and is adapted to the tapered end of the shaft 9 and is secured thereto by a nut 12.

13 is the inlet opening at the center of the section 5 and 14 is the outlet opening at the periphery of the fan. The hose pipe 15 is coupled to the nozzle 16, in which the opening 13 is formed. This pipe is connected to a coupling 17 at the dash board 18 of an automobile. This coupling is so formed that a suction pipe leading from a cleaning nozzle can be attached thereto.

Mounted on the shaft 9 is a pinion 19, which is splined to the shaft by a key 20 so that while it can slide thereon it will turn the shaft. Projecting from one end of the pinion 19 is a grooved extension 21 to which is adapted the arm 22 of a lever 23 pivoted at 24 to a bracket 25 secured to the bearing 7 by bolts 26. An operating rod 27 is attached to the upper end of the lever 23 and extends to the dash board of the automobile so that by operating this lever the pinion 19 can be shifted into and out of gear with a driven gear wheel 28, which is geared to the driving mechanism of the automobile.

It will be seen by the above construction that a device of this character can be applied to an automobile in such position that the pinion 19 can be thrown into and out of gear with the gear wheel 28 and that the suction pipe extends to the dash board of the automobile, or to any other convenient point, so that the hose of any suction head of a vacuum cleaner can be readily coupled thereto, and by moving the shifting rod 27 the pinion can be moved into engagement with the gear wheel 28 and the fan can be set in motion. The fan will suck the air with any dust drawn from the upholstery, or carpet, through the pipe 15 and will discharge it through the exhaust passage 14, which may lead to any suitable opening outside of the car.

While we have shown the suction device driven by gearing the fan shaft may be driven by a belt, flexible shaft or by friction and means may be provided for controlling the driving mechanism from the dash board.

We claim:

The combination in an engine driven vacuum cleaner for automobiles, of a driving mechanism; a bracket secured to a portion of the automobile; a bearing carried by said bracket; a fan casing adjacent said bearing, said fan casing having intake and exhaust nozzles; a second bracket bolted to the bearing; a shaft mounted in the bearing and having a fan at one end located in the casing; a power transmitting member on said shaft movable into and out of engagement with the said driving mechanism; a lever pivoted to the last mentioned bracket for shifting the power transmitting member; a coupling at the dash board; and a pipe connecting the coupling with the intake nozzle of the fan.

BERTUS W. KEAGLE.
JOSEPH KATZ.